UNITED STATES PATENT OFFICE.

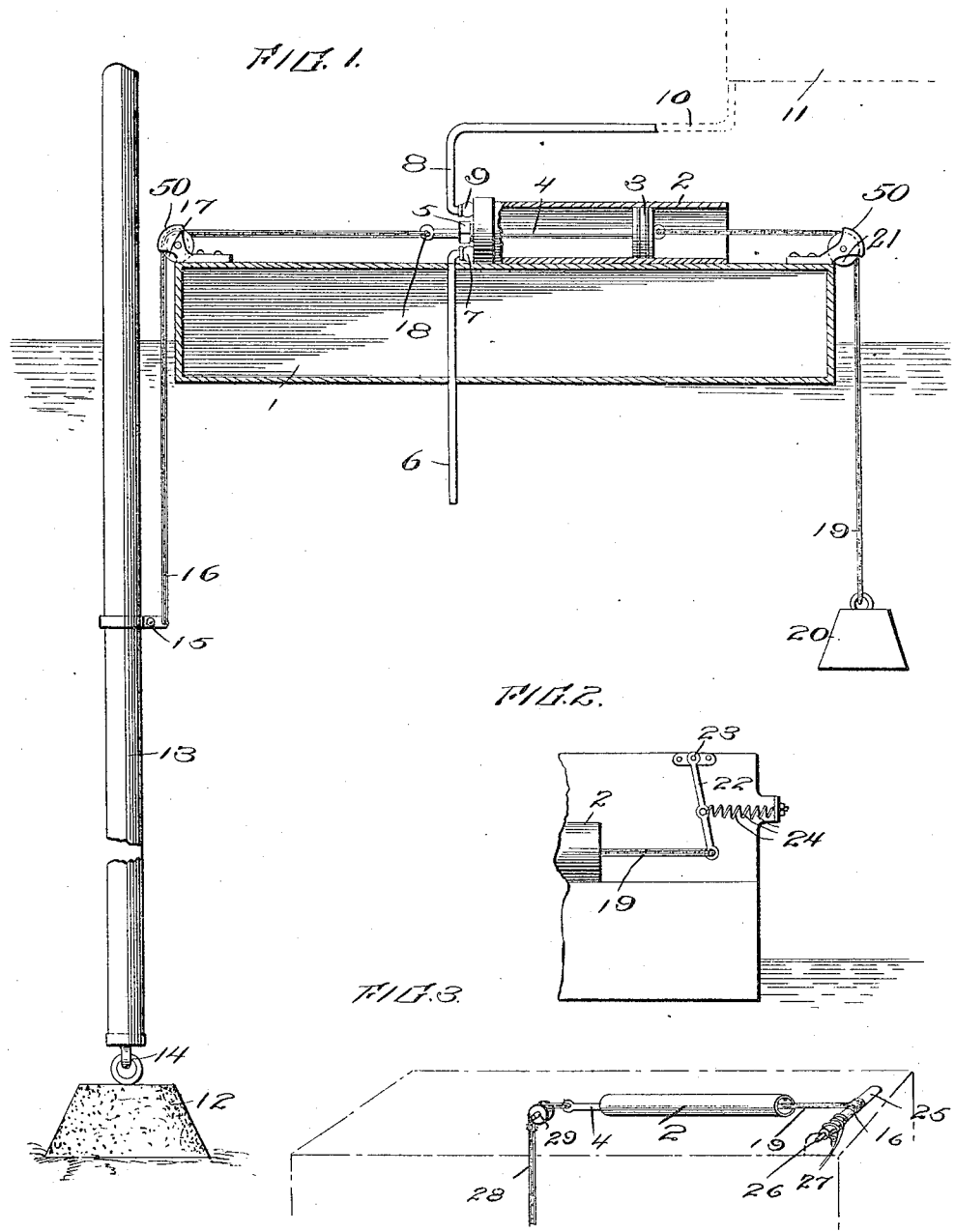

GEORGE W. WINSLOW, OF CHICAGO, ILLINOIS.

WAVE-MOTOR.

1,123,054.   Specification of Letters Patent.   Patented Dec. 29, 1914.

Application filed May 23, 1913. Serial No. 769,522.

*To all whom it may concern:*

Be it known that I, GEORGE W. WINSLOW, a citizen of Chicago, residing at 458 East Forty-seventh street, in the county of Cook and State of Illinois, have invented certain new and useful Improvements in Wave-Motors; and I do hereby declare the following to be a full, clear, and exact description of the invention, such as will enable others skilled in the art to which it appertains to make and use the same.

This invention relates to wave motors, and more particularly to a type of mechanism adapted to utilize the energy of waves for raising and storing water to be used later as a motive power for driving machinery.

An object of the invention is to provide a wave motor of simple construction which is adapted to rise and fall with the waves and carry mechanism one end of which is connected to a fixed submarine point so that the movements of the device may be utilized to actuate a pump or other suitable mechanism.

A further object of the invention is to provide a wave motor with a pump which is driven in one direction by the rise of the motor due to the action of the waves and is moved in the opposite direction by means of springs or weights, the water motor being balanced by the weights.

With these and other objects in view, the invention consists in certain novel features of construction as hereinafter fully described and claimed.

In the drawings, wherein one of several possible adaptations of my invention has been shown, Figure 1 is an elevation of the motor showing the pump in section, a weight being shown for the purpose of returning the piston of the pump to effect intake of water; Fig. 2 is a fragmentary view showing a modified form of device using a spring for returning the piston of the pump; and Fig. 3 is a still further modified form for accomplishing the results ascribed to the form shown in Fig. 2.

Like reference characters designate corresponding parts throughout the drawings.

The general method of utilizing the motion of waves for storing energy as shown in this application, is to provide a floating vessel with a horizontally disposed pump the piston of which has one side connected by means of a flexible cable or other suitable device, to a column secured to an anchor resting on the bottom of the sea, while the other side of the piston is connected to suitable means for returning the piston to draw water into the pump. The floating vessel may be of appropriate size and designed for use in any specified part of a sea, and is adapted to rise and fall with the waves, in such a way as to give the piston of the pump a reciprocating motion corresponding roughly to the rise and fall of the waves. While but one unit has been disclosed in the drawings, yet it is to be understood that two or more may be used on each float in such a way as to preserve the balance and hold the float firmly in place as it rides the waves.

I am aware that wave motors have been proposed wherein fixed weights have been used in connection with cables connected to a reciprocating power mechanism, but such devices have had weights secured at both of their ends for the purpose of balancing and also fixing the same relative to the bottom of the sea. My invention differs from these in that there is provided a cable one end of which is connected to the bottom of the sea, whereas the other end is provided with means for keeping the cable taut.

Referring to the drawings where the simplest embodiment of my invention has been shown, 1 designates an air-tight floating vessel which may be made of any capacity to meet the requirements of any particular installation, but it is to be understood that it is not desirable to build the float 1 so large as to be easily destroyed by heavy wind storms which would result in beating of the waves against the device. It is preferable to build the float in a number of comparatively small compartments where it is desired to utilize a large amount of power. Mounted upon the top of the float 1 at one end thereof, is a horizontal pump cylinder 2 shown in section in Fig. 1, within which reciprocates a piston 3 which carries a piston rod 4 passing through suitable packing 5 formed at the inlet end of the cylinder. That end of the cylinder which carries the stuffing box 5 is also provided with an inlet pipe 6 provided with a check valve 7 so designed as to allow water to pass into the cylinder, but prevent water from flowing back through this pipe, and there is provided an outlet pipe 8 provided with a suitable check valve 9 for allowing water to pass to the outlet 8, but preventing its return from said outlet to the cylinder. The outlet 8 has connected thereto any flexible tubing 10 which leads to a tank 11 shown in dotted lines in Fig. 1, and designed to be located at some distance above the level of the water.

In order that the floating vessel may be kept in substantially the same position, there is provided upon the bottom of the sea an anchor 12 which is coupled by means of a loose connection to a column 13, this loose connection in the drawings being shown as a link 14. The column 13 may be made of any suitable material and size, and preferably it is a pole or spar which extends above the surface of the water. Connected at any suitable point to the column 13, as at 15, is a cable 16, which is made flexible and leads over a pulley 17 suitably journaled upon one end of the floating vessel 1. This cable of course, could be a chain or in fact any of several constructions which are similar to cables and chains and flexible enough to be trained around a pulley. The upper end of the cable 16 is connected as at 18 to the piston rod 4 by means of any suitable joint. It will be understood of course that the point at which the cable 16 joins the column 13 will be sufficiently below the troughs of the waves so that the vessel 1 will always be above the point 15. Any suitable guard 50 may be provided upon the pulley 17 for preventing the cable 16 from slipping off in the event of a sudden lurch of the floating vessel 1. By means of the link connection 14, the float is kept at practically the same place, but the same is free to move to a limited extent.

A cable, chain, or other flexible member 19 is secured at one end to the piston 3 at a point opposite the point of junction between said piston and piston rod 4, and led thence out of the open end of the cylinder while the other end of the cable 19 hangs in the water and is secured to a submerged weight 20. There is provided upon the floating vessel 1, a pulley 21 over which the cable 19 passes, this pulley 21 being similar to the pulley 17. The weight 20 may be of any suitable shape for reducing the friction between its surface and the water as the same moves, due to the rise and fall of the float, and said weight may be made of any desirable material.

In the operation of the preferred form of the invention as disclosed, when the float 1 rises upon the crest of the wave, the piston 3 will be drawn to the left as the cable 16 is connected to a stationary point, and therefore cannot move with the float as the latter rises. This movement of the piston to the left will be accompanied by the closing of check valve 7 and the opening of check valve 9 so that any water contained in the cylinder will be forced through the outlet 8 and flexible tubing 10 to the tank 11. As the wave passes, and the float 1 drops into the trough of the waves, tension upon the cable 16 will be relieved and the weight 20, which was raised previously, will now descend and carry the piston 3 to the right, which motion of the piston will be accompanied by a closing of the valve 9 and opening of the valve 7. As the valve 7 opens, water will be drawn into the cylinder from the sea through the pipe or intake 6. This intake will be effected as long as the device is descending, while the forcing of the water into the tank 11 will take place as long as the device is rising, so that the piston 3 is always active. It will be understood of course that the weight 20 necessarily moves twice as rapidly as the floating vessel 1 so that in order to have the device operate, it will be necessary to have the same placed in water to a depth which will be sufficient to keep the weight 20 from striking the bottom of the sea when the float is at its lowest point. This weight 20 need not be excessively heavy insomuch as its chief function is to return the cylinder 3 and draw the water into the cylinder, but it should be sufficiently heavy to start the piston 3 upon its return as soon as the water motor begins to descend, and heavy enough not to be materially affected by the movement of the water. While the intake 6 has been shown as passing water into the cylinder, yet it will be entirely possible to have the end of the intake pipe 6 exposed to the air, in which case the cylinder would become an air pump and the tank 11 an air tank. By disposing the weight 20 and the column 13 in the relative position shown in Fig. 1, it will be observed that the floating vessel is between them, and further, that insomuch as the weight must travel upwardly twice as fast as the rising vessel, there will be sufficient pull upon the pulley 21 to preserve balance.

In the modified form of device for returning the piston as shown in Fig. 2, the chain 19 is secured to the lower end of a lever 22 which is pivoted as at 23 to the floating vessel. The retractile means employed for withdrawing the piston 3 is a helical spring 24 connected at any desirable point in the lever 22, and having one end secured to the floating vessel 1. The form shown in Fig. 3, has the chain 19 trained around a drum 25 which is mounted upon a shaft 26 journaled in any suitable manner to the water motor. Surrounding one end of the shaft 26, is a twist spring 27, one end of which is secured in the drum 25 while the other end is secured to the float. In each of these devices, it will be noted that as the strain is relieved in the cable 16, as the device descends, the springs 24 and 27 will operate in their respective devices to return the piston 3 and draw in a charge of water. When the springs are used, it may be desirable to have the cable 16 pass down through the center of the float and be secured to a suitable anchor. This arrangement is shown diagrammatically in Fig. 3, wherein the central cable 28 passes over a pulley 29 journaled approximately in the center of the floating vessel. This arrangement will serve to keep the float in balance when the weights 20 are dispensed with. Of course it will be entirely possible to have the cable 16 run from the center of the floating vessel as shown in Fig. 1, when the weight 20 is used, although this may disturb the balance slightly.

I am aware that along different parts of the coast, waves attain varying heights, and that also their periodicity varies, and it is to be understood that it is well within the scope of the invention to vary the proportions of the parts shown to accommodate them to any particular installation. It will be obvious that in certain places the height of the waves may be so great that the stroke of the piston would be altogether too long if connected directly to the weight 12 by means of the cable 16, but in this case it will be entirely possible to introduce such mechanical expedients as will reduce the length of stroke and give a corresponding increase in the pull on the piston. The tank 11 for receiving the water forced upward or air under pressure from the pump may be connected to any suitable support forming no part of the present invention.

What I claim is:

1. In a wave motor the combination with an anchor adapted to rest on the bottom, and a pole linked at its lower end to said anchor and adapted to rise above the surface of the water; of a float, a horizontally disposed pump mounted on the float, inlet and outlet pipes leading to said pump and having check valves, a cable connected with the pump piston and led over a pulley and down under water and connected with said pole, a second cable connected with the piston and led in the opposite direction, and means for imparting tension to this cable.

2. In a wave motor, the combination with an anchor adapted to rest on the bottom, and a pole linked at its lower end to said anchor and adapted to rise above the surface of the water; of a float having pulleys at its opposite ends, a horizontally disposed pump mounted on the float between said pulleys, inlet and outlet pipes leading to said pump and having check valves, a cable connected with the pump piston and led over one pulley and down under water and connected with said pole, a second cable connected with the piston and led over the other pulley and down under water, and a submerged weight carried by the lower end of the last-named cable.

3. In a water motor, the combination with a float having pulleys at its opposite ends, cables passing over said pulleys and down into the water, an anchor on the bottom to which one cable is connected, and a submerged weight to which the lower end of the other cable is connected; of a lift-and-force pump whose cylinder stands horizontal and is carried by the float between said pulleys, one end thereof being closed, valved inlet and outlet pipes opening through said closed end, the former being carried down to a point below the water, a piston within the cylinder and to which the upper end of the weight-cable is attached, and a piston rod leading through said closed end and connected with the other cable, all as and for the purpose set forth.

In testimony whereof I affix my signature in presence of two witnesses.

GEORGE W. WINSLOW.

Witnesses:
GEORGE E. WISSLER,
PAUL IROSE.

Copies of this patent may be obtained for five cents each, by addressing the "Commissioner of Patents Washington, D. C."